United States Patent
Wagh et al.

(10) Patent No.: US 10,146,291 B2
(45) Date of Patent: *Dec. 4, 2018

(54) METHOD, APPARATUS, AND SYSTEM FOR IMPROVING RESUME TIMES FOR ROOT PORTS AND ROOT PORT INTEGRATED ENDPOINTS

(71) Applicant: Intel Corporation, Santa Clara, CA (US)

(72) Inventors: Mahesh Wagh, Portland, OR (US); Robert E. Gough, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/757,924

(22) Filed: Dec. 24, 2015

(65) Prior Publication Data
US 2016/0209912 A1 Jul. 21, 2016

Related U.S. Application Data

(63) Continuation of application No. 13/835,275, filed on Mar. 15, 2013.

(51) Int. Cl.
*G06F 1/32* (2006.01)
*G06F 9/44* (2006.01)
(Continued)

(52) U.S. Cl.
CPC ............ *G06F 1/3243* (2013.01); *G06F 1/325* (2013.01); *G06F 1/3206* (2013.01);
(Continued)

(58) Field of Classification Search
CPC ........ G06F 1/3206; G06F 1/325; G06F 13/42; G06F 1/3246; G06F 9/4418; Y02B 60/1246; Y02B 60/186; H04L 49/15
See application file for complete search history.

(56) References Cited

U.S. PATENT DOCUMENTS 8,201,005 B2 * 6/2012 Wertheimer .......... G06F 1/3203
713/323
2007/0043963 A1 2/2007 Cheng et al.
(Continued)

FOREIGN PATENT DOCUMENTS

JP 2002-304237 10/2002
JP 2007-290178 11/2007
(Continued)

OTHER PUBLICATIONS

Zheng, Rong. "On-demand power management for ad hoc networks". Ad Hoc Networks 3 (2005) p. 51-68.*
(Continued)

*Primary Examiner* — Terrell S Johnson
(74) *Attorney, Agent, or Firm* — Alliance IP, LLC

(57) ABSTRACT

A serial point-to-point link interface to enable communication between a processor and a device, the high speed serial point-to-point link interface including a transmitter to transmit serial data, a receiver to deserialize serial data, and control logic to implement a protocol stack. The protocol stack supports a plurality of power management states, including an active state, a first off state, in which a supply voltage is maintained, and a second off state, in which the supply voltage is not to be provided to the device. The protocol stack provides a default recovery time to allow the device to begin a transition from the first off state to the active state prior to accessing the device. The protocol stack further provides for accessing the device prior to expiration of the default recovery time to complete the transition based on a device-advertised recovery time.

3 Claims, 8 Drawing Sheets

(51) Int. Cl.
*H04L 12/933* (2013.01)
*G06F 13/42* (2006.01)
*G06F 9/4401* (2018.01)

(52) U.S. Cl.
CPC .......... *G06F 1/3246* (2013.01); *G06F 9/4418* (2013.01); *G06F 13/42* (2013.01); *H04L 49/15* (2013.01); *Y02D 10/151* (2018.01); *Y02D 50/20* (2018.01)

(56) References Cited

U.S. PATENT DOCUMENTS

| | | |
|---|---|---|
| 2007/0186088 A1 | 8/2007 | Khatri et al. |
| 2009/0207057 A1* | 8/2009 | Diab ............... H03M 9/00 341/100 |
| 2009/0235105 A1 | 9/2009 | Branover et al. |
| 2010/0287394 A1* | 11/2010 | Branover ............ G06F 1/3203 713/323 |
| 2011/0026062 A1 | 2/2011 | Takatani |
| 2011/0107129 A1* | 5/2011 | Sinykin ............ G06F 1/3228 713/322 |
| 2012/0198102 A1 | 8/2012 | Saito |
| 2013/0007489 A1* | 1/2013 | Unnikrishnan ....... G06F 1/3209 713/320 |
| 2013/0173837 A1* | 7/2013 | Glaser ............... G06F 13/4282 710/314 |
| 2013/0252543 A1 | 9/2013 | Badi et al. |
| 2014/0082242 A1 | 3/2014 | Murphy et al. |
| 2014/0195833 A1 | 7/2014 | Wang et al. |
| 2014/0281622 A1 | 9/2014 | Wagh et al. |
| 2016/0209911 A1 | 7/2016 | Wagh et al. |

FOREIGN PATENT DOCUMENTS

| | | |
|---|---|---|
| JP | 2009-187552 | 8/2009 |
| JP | 2011-34267 | 2/2011 |
| JP | 2012-176611 | 9/2012 |

OTHER PUBLICATIONS

Office Action in Japanese Patent Application No. 2014-034243, mailed on Feb. 10, 2015, English translation, 4 pages.
Preliminary Rejection in KR Patent Application No. 2014-0029884, mailed on Jun. 12, 2015, English translation, 5 pages.
Office Action in Japanese Patent Application No. 2014-034243, mailed on Aug. 18, 2015, English translation, 4 pages.
USPTO Nov. 10, 2015 Nonfinal Rejection in U.S. Appl. No. 13/835,275, 23 pages.
Office Action in RU 2014109920, mailed on Sep. 30, 2015, 4 pages.
U.S. Appl. No. 14/998,158, Inventors Mahesh Wagh et al., entitled Method, Apparatus, and ystem for Improving Resume Times for Root Ports and Root Port Integrated Endpoints, filed Dec. 24, 2015, 45 pages.
Final Rejection in KR Patent Application No. 2014-0029884, mailed on Dec. 9, 2015, English translation, 3 pages.
USPTO Jun. 15, 2016 Final Rejection in U.S. Appl. No. 13/835,275, 22 pages.
USPTO Sep. 26, 2016 Nonfinal Rejection in U.S. Appl. No. 14/998,158, 12 pages.
Notice of Reasons for Rejection from JP Application No. 2015-247188, mailed on Sep. 27, 2016, with English translation, 4 pages.
USPTO Jan. 13, 2017 Nonfinal Rejection in U.S. Appl. No. 14/998,158, 10 pages.
Zheng, Rong et al., "On-demand power management for ad hoc networks," Ad Hoc Networks 3, (2005), pp. 51-68, 18 pages.
USPTO May 26, 2017 Notice of Allowance in U.S. Appl. No. 14/998,158, 6 pages.

\* cited by examiner

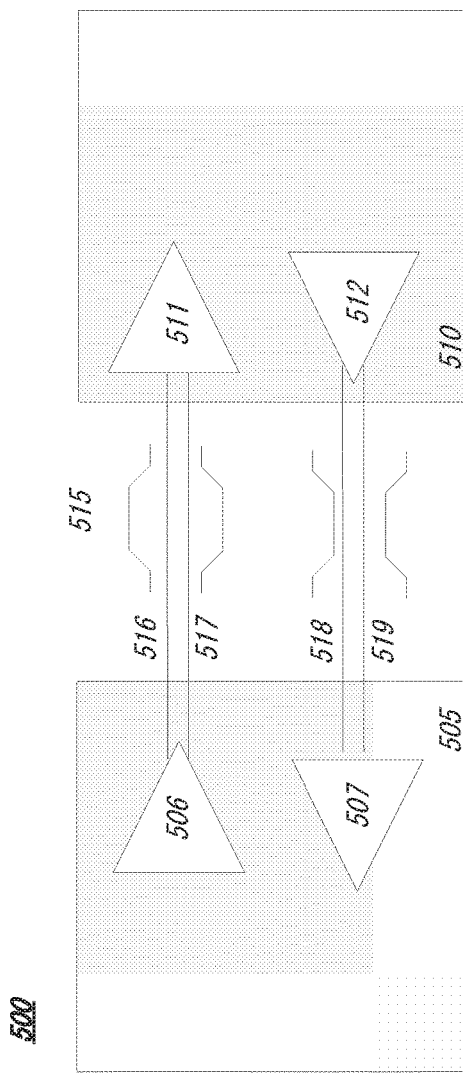

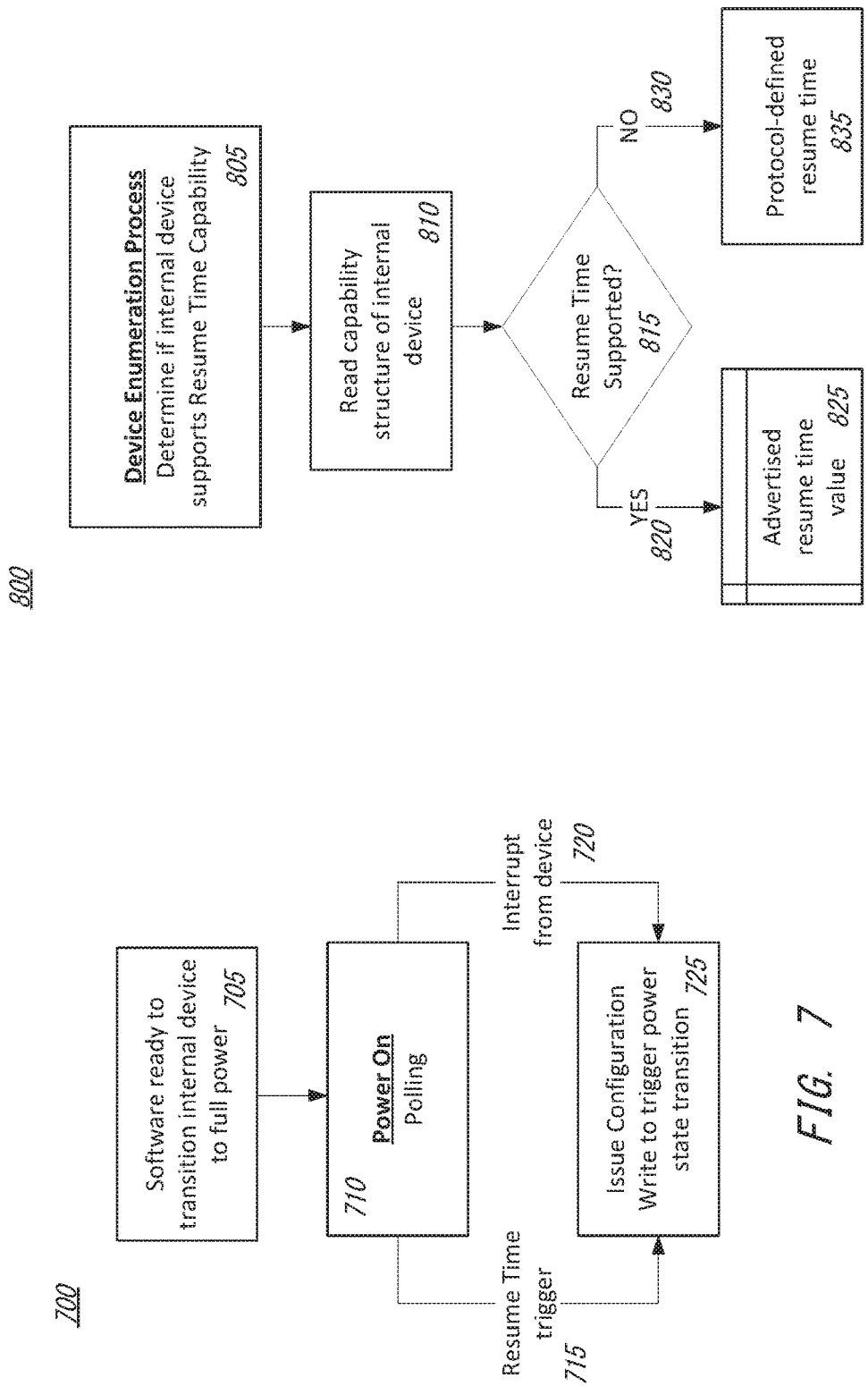

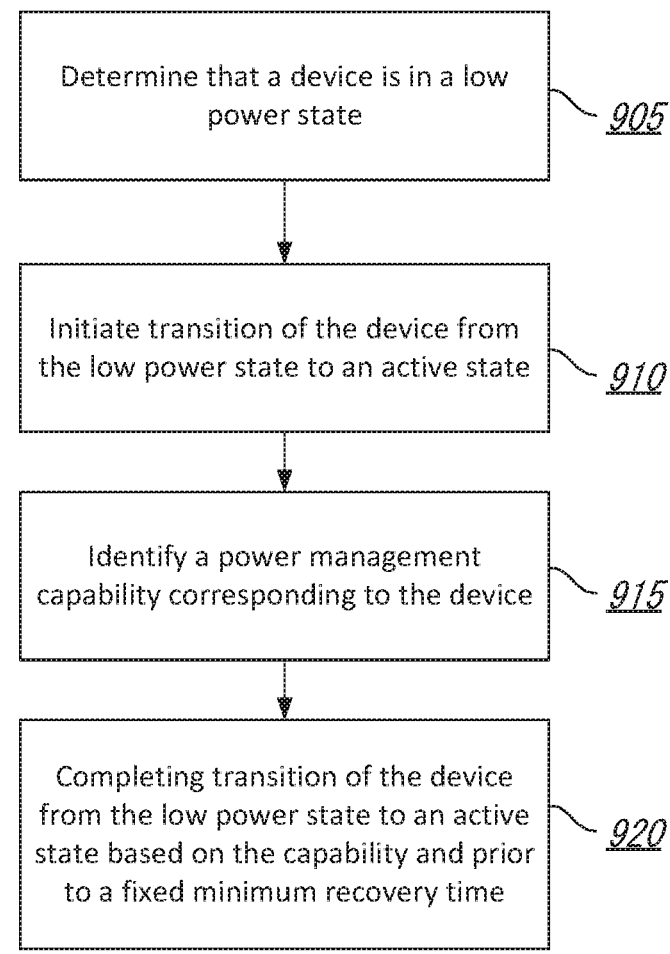

METHOD, APPARATUS, AND SYSTEM FOR IMPROVING RESUME TIMES FOR ROOT PORTS AND ROOT PORT INTEGRATED ENDPOINTS

This application is a continuation of and claims the benefit of priority to U.S. patent application Ser. No. 13/835,275, filed Mar. 15, 2013, which is hereby incorporated by reference herein in its entirety.

FIELD

This disclosure pertains to computing system, and in particular (but not exclusively) to resume times for root ports and root port integrated endpoints.

BACKGROUND

As electronic apparatuses become more complex and ubiquitous in the everyday lives of users, more and more diverse requirements are placed upon them. To satisfy many of these requirements, many electronic apparatuses comprise many different devices, such as a CPU, a communication device, a graphics accelerator, etc. In many circumstances, there may be a large amount of communication between these devices. Furthermore, many users have high expectations regarding apparatus performance. Users are becoming less tolerant of waiting for operations to be performed by their apparatuses. In addition, many apparatuses are performing increasingly complex and burdensome tasks that may involve a large amount of inter-device communication. Therefore, there may be some communication between these devices that would benefit from rapid response times.

BRIEF DESCRIPTION OF THE DRAWINGS

Embodiments are illustrated by way of example and not by way of limitation in the FIGURES of the accompanying drawings, in which like references indicate similar elements and in which:

FIG. 4 illustrates an embodiment of a request or packet to be generated or received within an interconnect architecture according to at least one example embodiment.

FIG. 5 illustrates an embodiment of a transmitter and receiver pair for an interconnect architecture according to at least one example embodiment.

FIG. 7 is a flow diagram according to at least one embodiment.

FIG. 8 is a flow diagram according to at least one embodiment.

FIG. 9 is a flow diagram according to at least one example embodiment.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to improving resume times for root ports and root port integrated endpoints, such as in computing platforms or microprocessors, other embodiments are applicable to other types of integrated circuits and logic devices. Similar techniques and teachings of embodiments described herein may be applied to other types of circuits or semiconductor devices that may also benefit from improved resume times. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for improved resume times.

Figure 1:
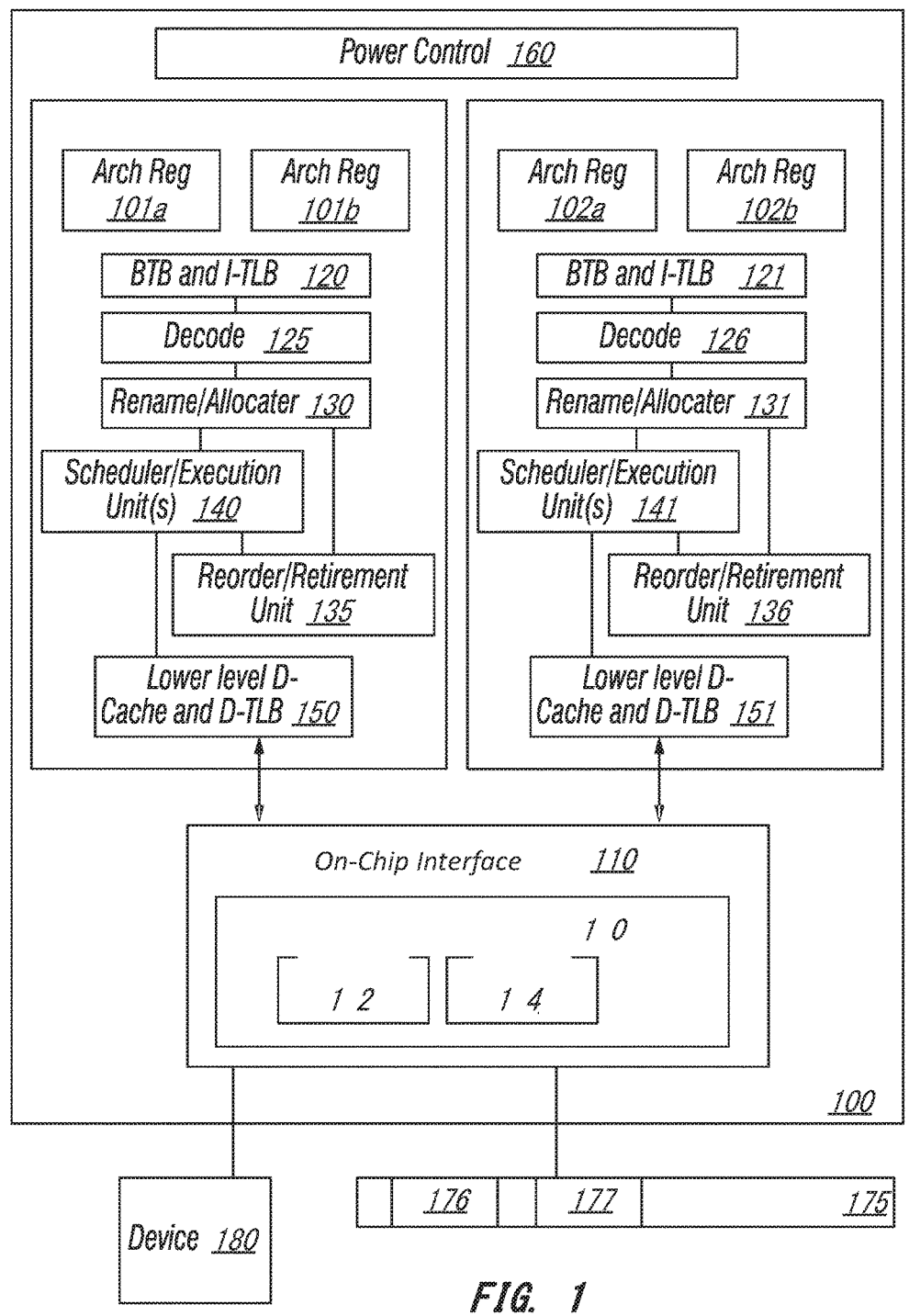
FIG. 1 illustrates an embodiment of a block diagram for a computing system including a multicore processor according to at least one example embodiment.

FIG. 1 is a block diagram illustrating components associated with improving resume times for root ports and root port integrated endpoints according to at least one example embodiment. The examples of FIG. 1 are merely examples of components associated with improving resume times for root ports and root port integrated endpoints, and do not limit the scope of the claims. For example, operations attributed to a component may vary, number of components may vary, composition of a component may vary, and/or the like. For example, in some example embodiments, operations attributable to one component of the example of FIG. 1 may be allocated to one or more other components.

Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment).

However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, branch target buffer (BTB) and instruction-translation buffer (I-TLB) 120, load/store buffers, and queues may be shared through partitioning. Other resources, such as general purpose internal registers, page-table base register(s), low-level data-cache and data-TLB 150, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a BTB and I-TLB 120 to predict branches to be executed/taken and a BTB and I-TLB 120 to store address translation entries for instructions.

Core 101 further includes decode module 125 coupled to BTB and I-TLB 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 125, in one embodiment, recognize the same ISA (or a subset thereof). Alternatively, in a heterogeneous core environment, decoders 125 recognize a second ISA (either a subset of the first ISA or a distinct ISA).

In one example, renamer/allocator block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface module 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, device 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

In some implementations, a power management controller 160 can also be provided and implemented in hardware and software. A system, and devices connected to the system, can support multiple power states, including full power, low power, and no power states, among other (e.g., intermediate)

states and conditions. The power management controller 160 can provide functions and perform tasks to assist in minimizing system power consumption, manage system thermal limits, and maximize system battery life, among other functionality. Power management can include managing other functionality and characteristics of the system, including system speed, noise, battery life, and AC power consumption, among other examples.

On-chip interface can include a resume time module 104. Resume time module 104 can include a processor 182 and memory 184. On-chip interface 110 and device 180 may communicate through a peripheral component interconnect express (PCIe)-compliant, or other connection. In some interconnect protocols, such as peripheral component interconnect (PCI) and PCIe, architected mechanisms can be provided to delay entries of devices into full power states (e.g., in connection with certain power management policies and capabilities). For instance, software, such as power management logic of a device operating system, can at least partially control entries and exits into various power states. In some instances, platform policies can provide minimum recovery times (delays) before allowing software to issuing configuration requests to device, for instance, in connection with the initialization of a power state. For instance, to improve idle power usage, power management policies and functionality can attempt to place devices, including discrete attached devices, Root Ports (RP), and Root Complex Integrated End Points (RCIE), etc., as well as external devices connected over the interconnect, into power managed states where the power to these devices could be removed, the devices could operate in a lower power state, or these devices could be operating under auxiliary power. On resume from these power states, software waits for a specified amount of time (e.g., 10 ms, 100 ms, etc.) before it will issue configuration requests. This can have a significant impact on resume time. Such defined minimum recovery times, while advantageous in some contexts and in connection with some devices, however, may be undesirable in other contexts and in connection with other devices.

In some implementations, on-chip interface can include a resume time module 104. Resume time module 104 can include a processor 182 and memory 184. Resume time module 104 can be configured to allow an internal device, such as a root port, designated port (DP), or RCIE to advertise a device-specific recovery time indicating how soon after a power state transition (e.g., initial power on, D3 to D0 transition, etc.) the device will be ready for first configuration (e.g., in connection with software). In an embodiment, resume time module 104 can further include an interrupt mechanism (e.g., capability description, control mechanism to enable interrupts) for internal devices to trigger an interrupt when it completes or is ready to complete a power state transition (e.g., initial power-on, D3 to D0 transition, etc.), to further force an end to a pre-set recovery time or otherwise initiate configuration tasks to be performed by software.

In some implementations, device-specific resume time capabilities can be defined in one or more capability registers and can be accessed by one or more power management tools, including software-based tools. In one example, during enumeration of devices (e.g., one or more devices 180, including external or internal devices), resume time module 104 may access a device's resume time capability and store it in memory 184 for later use. Resume time module 104 may also read the interrupt capability of a device and implement an interrupt mechanism instead of a polling mechanism to enable triggering and recognition of an interrupt when an internal device is ready for configuration access. For example, at some point, an internal device can transition into a low power state. In an embodiment, resume time module 104 can determine that the internal device is to transition from the low power state into a full power state. Further, resume time module 104 may retrieve the resume time advertised value for device 180 from memory 184 and then issue a first configuration request after waiting for the time period in memory 184 that was advertised by the internal device in a corresponding capability structure, among other examples.

In another embodiment, resume time module 104 can determine that it is going to apply power to the sub-system that has control of a device 180. If device 180 is configured to send an interrupt when device 180 has exited the low power state, resume time module 104 may wait for the interrupt to be received from the device 180 indicating that it is ready for first configuration access. In both cases, resume time module can remove the 100 ms fixed architected wait time before accessing the device with first configuration access. Resume time module 104 may also remove the a fixed, architected wait time for software before accessing a device with first configuration access after writing to a power management control and status register (PMCSR). To maintain backwards compatibility, architected recovery times, (e.g., legacy 100 ms or 10 ms (for access after PMCSR write) delay) should not be extended by resume time module 104 and can be supported as a default for devices that do not employ custom resume time capabilities. As stated above, on-chip interface 110 and device 180 may communicate through a link connection, such as a PCIe, MIPI, QPI, or other protocol-compliant interconnect link.

A primary goal of PCIe is to enable components and devices from different vendors to inter-operate in an open architecture, spanning multiple market segments; Clients (Desktops and Mobile), Servers (Standard and Enterprise), and Embedded and Communication devices. PCIe is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCIe take advantage of advances in point-to-point interconnects, switch-based technology, and packetized protocol to deliver new levels of performance and features. Power Management, Quality Of Service (QoS), Hot-Plug/Hot-Swap support, Data Integrity, and Error Handling are among some of the advanced features supported by PCIe.

Figure 2:
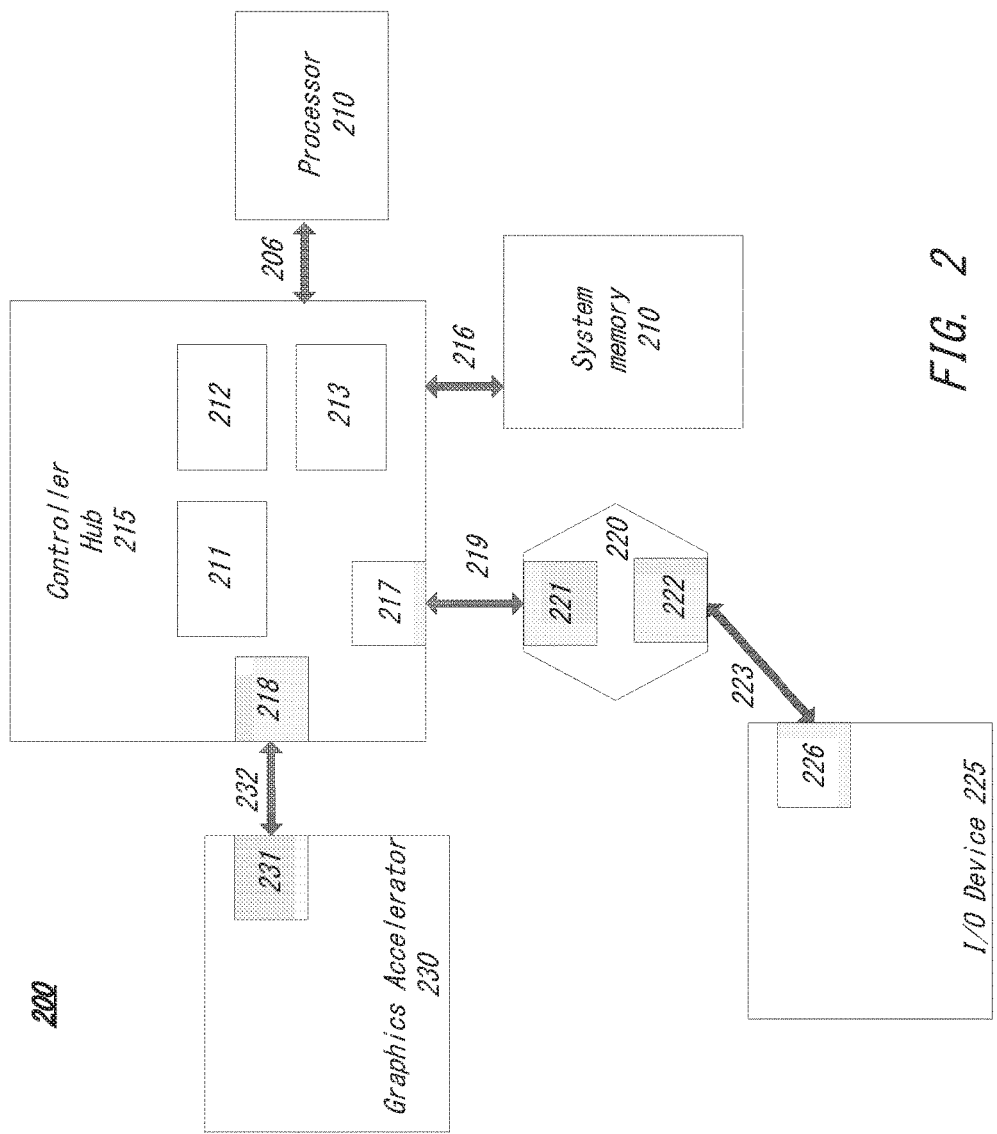
FIG. 2 illustrates an embodiment of a computing system including an interconnect architecture according to at least one example embodiment.

Referring to FIG. 2, an embodiment of a fabric composed of point-to-point links that interconnect a set of components is illustrated. System 200 includes processor 205 and system memory 210 coupled to controller hub 215. Processor 205 includes any processing element, such as a microprocessor, a host processor, an embedded processor, a co-processor, or other processor. Processor 205 is coupled to controller hub 215 through front-side bus (FSB) 206. In one embodiment, FSB 206 is a serial point-to-point interconnect as described below. In another embodiment, link 206 includes a serial, differential interconnect architecture that is compliant with different interconnect standard.

System memory 210 includes any memory device, such as random access memory (RAM), non-volatile (NV) memory, or other memory accessible by devices in system 200. System memory 210 is coupled to controller hub 215 through memory interface 216. Examples of a memory interface include a double-data rate (DDR) memory interface, a dual-channel DDR memory interface, and a dynamic RAM (DRAM) memory interface.

In one embodiment, controller hub 215 is a root hub, root complex, or root controller in a PCIe interconnection hierarchy. Examples of controller hub 215 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 205, while controller 215 is to communicate with I/O devices, in a similar manner as described below. In some embodiments, peer-to-peer routing is optionally supported through root complex 215.

Here, controller hub 215 is coupled to switch/bridge 220 through serial link 219. Input/output modules 217 and 221, which may also be referred to as interfaces/ports 217 and 221, include/implement a layered protocol stack to provide communication between controller hub 215 and switch 220. In one embodiment, multiple devices are capable of being coupled to switch 220.

Switch/bridge 220 routes packets/messages from device 225 upstream, i.e. up a hierarchy towards a root complex, to controller hub 215 and downstream, i.e. down a hierarchy away from a root controller, from processor 205 or system memory 210 to device 225. Switch 220, in one embodiment, is referred to as a logical assembly of multiple virtual PCI-to-PCI bridge devices. Device 225 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 225 may include a PCIe to PCI/PCI-X bridge to support legacy or other version PCI devices. Endpoint devices in PCIe are often classified as legacy, PCIe, or root complex integrated endpoints.

Graphics accelerator 230 is also coupled to controller hub 215 through serial link 232. In one embodiment, graphics accelerator 230 is coupled to an MCH, which is coupled to an ICH. Switch 220, and accordingly I/O device 225, is then coupled to the ICH. I/O modules 231 and 218 are also to implement a layered protocol stack to communicate between graphics accelerator 230 and controller hub 215. Similar to the MCH discussion above, a graphics controller or the graphics accelerator 230 itself may be integrated in processor 205. Further, in some implementations, one or more internal devices (e.g., 211, 212, 213) can be provided, for instance, on a chipset, controller hub, root complex, etc. For instance, root complex integrated endpoints (RCIE), a downstream port or root port (e.g., 217), internal PCI devices, and other internal devices can be provided. Functionality described herein can apply to internal devices as well as external devices.

Figure 3:
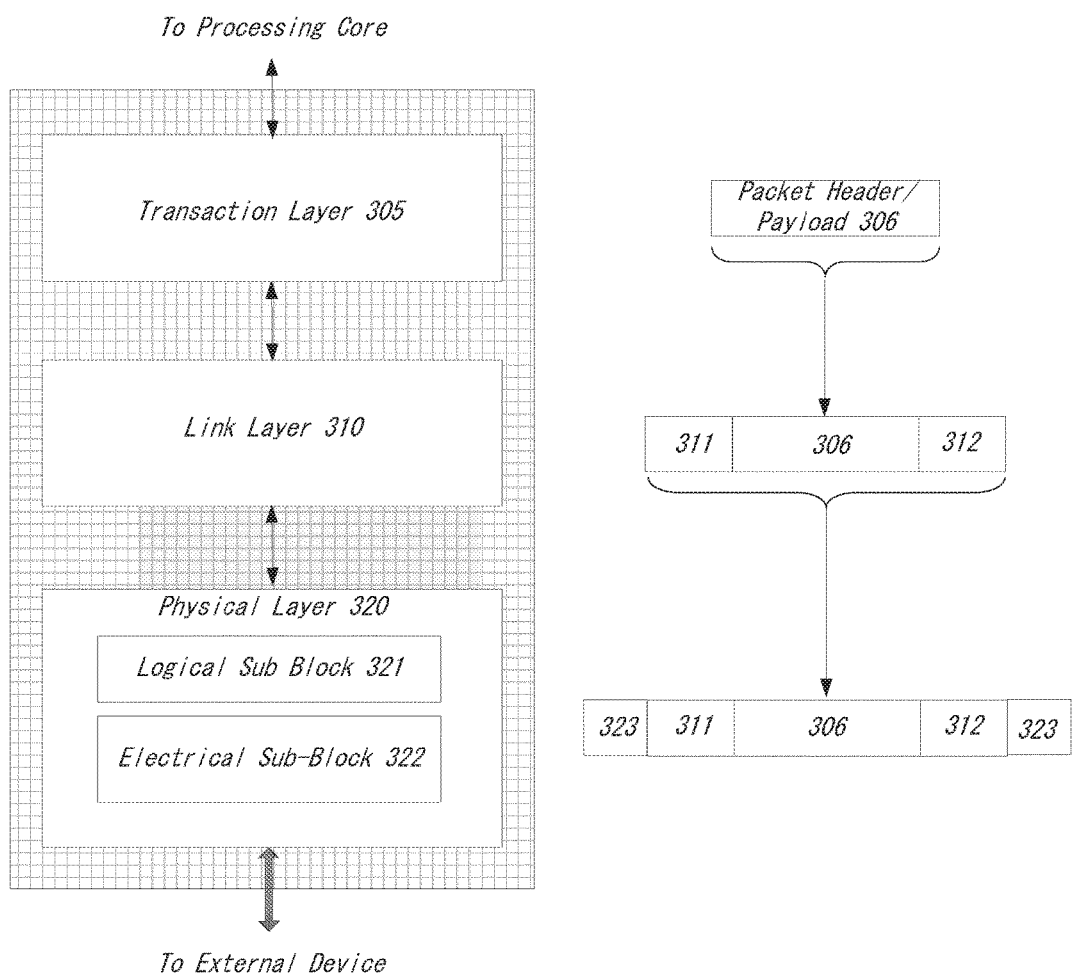
FIG. 3 illustrates an embodiment of a interconnect architecture including a layered stack according to at least one example embodiment.

Referring to FIG. 3, an embodiment of a layered protocol stack is illustrated. Layered protocol stack 300 includes any form of a layered communication stack, such as a Quick Path Interconnect (QPI) stack, a PCIe stack, a next generation high performance computing interconnect stack, or other layered stack. Although the discussion immediately below in reference to FIGS. 2-5 are in relation to a PCIe stack, the same concepts may be applied to other interconnect stacks. In one embodiment, protocol stack 300 is a PCIe protocol stack including transaction layer 305, link layer 310, and physical layer 320. An interface, such as interfaces 217, 218, 221, 222, 226, and 231 in FIG. 2, may be represented as communication protocol stack 300. Representation as a communication protocol stack may also be referred to as a module or interface implementing/including a protocol stack.

PCIe uses packets to communicate information between components. Packets are formed in the Transaction Layer 305 and Data Link Layer 310 to carry the information from the transmitting component to the receiving component. As the transmitted packets flow through the other layers, they are extended with additional information necessary to handle packets at those layers. At the receiving side the reverse process occurs and packets get transformed from their Physical Layer 320 representation to the Data Link Layer 310 representation and finally (for Transaction Layer Packets) to the form that can be processed by the Transaction Layer 305 of the receiving device.

Transaction Layer

In one embodiment, transaction layer 305 is to provide an interface between a device's processing core and the interconnect architecture, such as data link layer 310 and physical layer 320. In this regard, a primary responsibility of the transaction layer 305 is the assembly and disassembly of packets (i.e., transaction layer packets, or TLPs). The translation layer 305 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in transaction layer 305. An external device at the opposite end of the link, such as controller hub 115 in FIG. 2, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents. Therefore, in one embodiment, transaction layer 305 assembles packet header/payload 306. Format for current packet headers/payloads may be found in the PCIe specification at the PCIe specification website.

Quickly referring to FIG. 4, an embodiment of a PCIe transaction descriptor is illustrated. In one embodiment, transaction descriptor 400 is a mechanism for carrying transaction information. In this regard, transaction descriptor 400 supports identification of transactions in a system. Other potential uses include tracking modifications of default transaction ordering and association of transaction with channels.

Transaction descriptor 400 includes global identifier field 402, attributes field 404 and channel identifier field 406. In the illustrated example, global identifier field 402 is depicted as including local transaction identifier field 408 and source identifier field 410. In one embodiment, global transaction identifier 402 is unique for all outstanding requests.

According to one implementation, local transaction identifier field 408 is a field generated by a requesting agent, and it is unique for all outstanding requests that require a completion for that requesting agent. Furthermore, in this example, source identifier 410 uniquely identifies the requestor agent within a PCIe hierarchy. Accordingly, together with source ID 410, local transaction identifier 408 field provides global identification of a transaction within a hierarchy domain.

Attributes field 404 specifies characteristics and relationships of the transaction. In this regard, attributes field 404 is potentially used to provide additional information that allows modification of the default handling of transactions. In one embodiment, attributes field 404 includes priority field 412, reserved field 414, ordering field 416, and no-snoop field 418. Here, priority sub-field 412 may be modified by an initiator to assign a priority to the transaction. Reserved attribute field 414 is left reserved for future, or vendor-defined usage. Possible usage models using priority or security attributes may be implemented using the reserved attribute field.

In this example, ordering attribute field 416 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 418 is utilized to determine if transactions are snooped. As shown, channel ID Field 406 identifies a channel that a transaction is associated with.

Link Layer

Link layer 310, also referred to as data link layer 310, acts as an intermediate stage between transaction layer 305 and physical layer 320. In one embodiment, a responsibility of the data link layer 310 is providing a reliable mechanism for exchanging Transaction Layer Packets (TLPs) between two components a link. One side of data link layer 310 accepts TLPs assembled by transaction layer 305, applies packet sequence identifier 311, i.e. an identification number or packet number, calculates and applies an error detection code, i.e. CRC 312, and submits the modified TLPs to physical layer 320 for transmission across a physical to an external device.

Physical Layer

In one embodiment, physical layer 320 includes logical sub block 321 and electrical sub-block 322 to physically transmit a packet to an external device. Here, logical sub-block 321 is responsible for the "digital" functions of physical layer 321. In this regard, the logical sub-block includes a transmit section to prepare outgoing information for transmission by physical sub-block 322, and a receiver section to identify and prepare received information before passing it to link layer 310.

Physical block 322 includes a transmitter and a receiver. The transmitter is supplied by logical sub-block 321 with symbols, which the transmitter serializes and transmits onto to an external device. The receiver is supplied with serialized symbols from an external device and transforms the received signals into a bit-stream. The bit-stream is de-serialized and supplied to logical sub-block 321. In one embodiment, an 8b/10b transmission code is employed, where ten-bit symbols are transmitted/received. Here, special symbols are used to frame a packet with frames 323. In addition, in one example, the receiver also provides a symbol clock recovered from the incoming serial stream.

As stated above, although transaction layer 305, link layer 310, and physical layer 320 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Referring next to FIG. 5, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 506/511 and a receive pair 512/507. Accordingly, device 505 includes transmission logic 506 to transmit data to device 510 and receiving logic 507 to receive data from device 510. In other words, two transmitting paths, i.e. paths 516 and 517, and two receiving paths, i.e. paths 518 and 519, are included in a PCIe link.

A transmission path refers to any path for transmitting data, such as a transmission line, a copper line, an optical line, a wireless communication channel, an infrared communication link, or other communication path. A connection between two devices, such as device 505 and device 510, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 6:
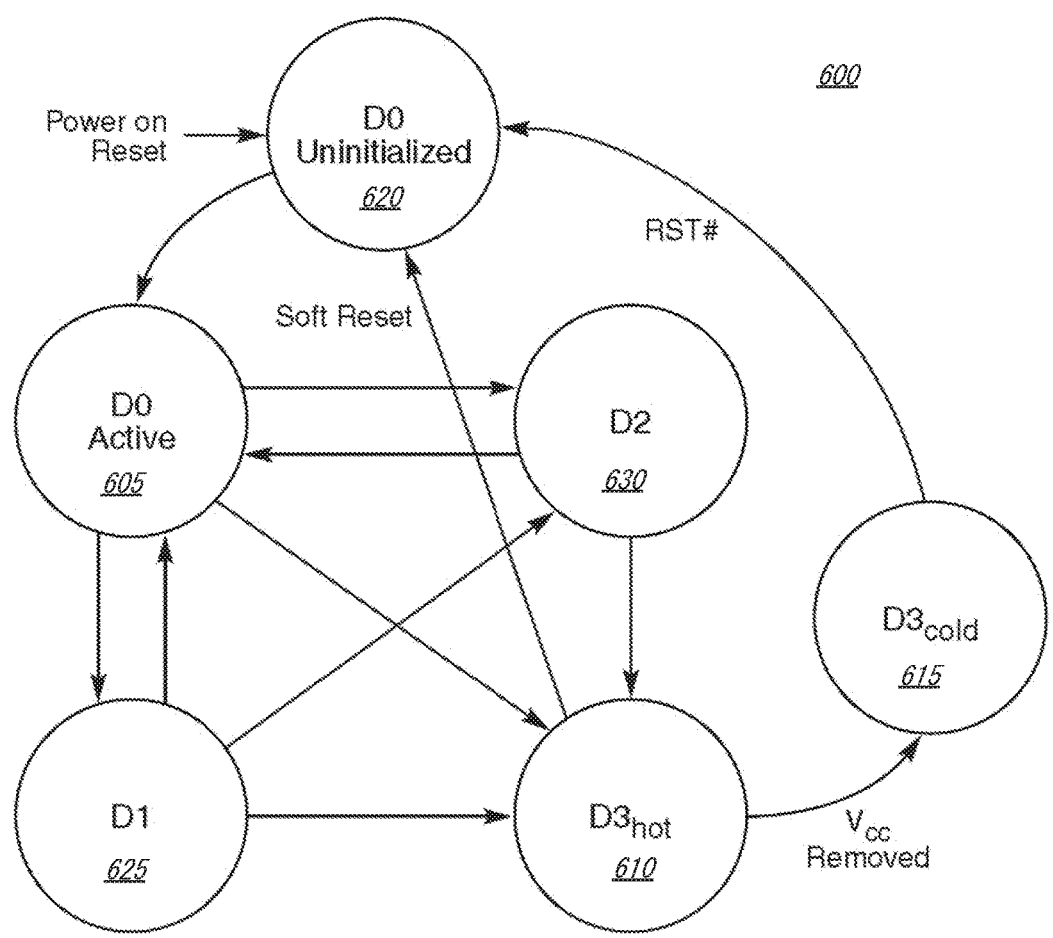
FIG. 6 illustrates an example power management state transition chart.

As noted above, various platforms, such as PCIe, can support multiple power management states. FIG. 6 illustrates an example state transition chart 600 illustrating example power management states (e.g., 605, 610, 615, 620, 625, 630) and transitions between the states. In the example of FIG. 6, four main power states are supported. For instance, a D0 state (e.g., 605, 620) can be a maximum powered, or active, state at one extreme, and a D3 state (e.g., 610, 615) providing a power "off" state. States D1 (e.g., 625) and D2 (e.g., 630) can provided intermediate power states representing, for instance, sleep or light sleep states for a device. In one example, a D3 hot state (e.g., 610) can be provided where Vcc is still applied to the device, to differentiate from a D3 cold state (e.g., 615) where Vcc is removed to completely power off the device.

As represented in FIG. 6, transitions can be defined between the various states (e.g., 605, 610, 615, 620, 625, 630). For example, in one implementation, devices in state D3 hot can be returned to D0 by first bringing the device, upon power up, into a D0 Uninitialized 620 state, for instance by writing the D0 state command to a corresponding power management control state register. In another example, in device state D3 cold, a function can be brought back to D0 from D3 cold (the only legal state transition from D3 cold). In some instances, software can be invoked in connection with a power management state transition, for instance to perform a full or partial reinitialization of the function including its corresponding configuration space. Further, as introduced above, a minimum recovery time requirement can be defined in some instances (e.g., enforced by system software) between when a function is programmed from D3 to D0 and when the function is accessed (including configuration accesses). This can allow time for the function to reset itself and bring itself to a power-on condition. However, as introduced above, such default minimum recovery times can introduce unnecessary delays into the resume time for particular devices. Accordingly, in some implementations, a resume time capability can be provided to allow the device to instead advertise a device-specific recovery time (e.g., shorter (or longer) than an architected minimum recovery time. Additionally, capabilities can be provided to allow a device to initiate an interrupt to trigger configuration accesses prior to the conclusion of an architected (or, even, in some implementations, a device-advertised) minimum recovery time, among other potential examples.

Turning to FIG. 7, a simplified flow diagram 700 is shown. A software controller, such as power management tools of an operating system, can be ready to transition a particular device, such as an internal device of a chip set or system on chip, to full power and cause the device to be powered on 710 and begin a transition from a low or no power state to an active state (e.g., in connection with a particular function to be performed utilizing the device). Polling (e.g., 710) can take place based on capabilities defined for the device in a corresponding power management register, extended capability structure, or other structure or register. For instance, the controller can identify a resume time for the device (e.g., an architected time or advertised time delay) and issue a configuration write to trigger 725 completion of the power state transition upon identifying that the resume time has lapsed. Alternatively, a device can have an interrupt capability defined, for instance, in a capability structure or register, and the controller can identify the capability and wait for an interrupt 720 from the device indicating that the device is ready to enter the active state and receive configuration accesses.

Turning to FIG. 8, a device enumeration process 805 can be performed, in some implementations, to determine if a device, such as an RCIE, root port, downstream port, or other device, supports one or more resume time capabilities. In the particular example of FIG. 8, the enumeration process can ready 810 a capability structure corresponding to the device and determine 815 whether a customized resume or recovery time is advertised and supported. An enumeration process 805 can, in some instances, also determine whether an interrupt capability is also defined for the device to assist in hastening recovery of the device. If it is determined that resume time is supported (e.g., 820) an advertised recovery value can be identified 825 that is specific to the device (e.g., and specified in the capability structure). The advertised recovery value can then be followed by the software controller when beginning configuration access in connection with a power state transition of the device. Alternatively, if it is determined that a specialized resume time is not supported by the device (e.g., 830), the software controller can default to architected protocols, including standard minimum recovery times defined through the architecture (e.g., a 10 ms, 100 ms, etc. fixed, minimum recovery time).

FIG. 9 is a flow diagram showing a set of operations 900 according to at least one example embodiment. Apparatus, for example resume time module 104 of FIG. 1, or a portion thereof, may utilize the set of operations 900. The apparatus may comprise means for performing the operations of FIG. 9. In an example embodiment, an apparatus is transformed by having memory, for example memory 184 and/or memory 175 of FIG. 1, comprising computer code configured to, working with a processor, cause the apparatus to perform set of operations 900.

At block 905, a device can be determined (e.g., from a corresponding register) to be in a low power state. Transition of the device from the low power state to an active state can be initiated, at block 910, for instance, by an at least partially software-based controller. A fixed minimum recovery time can be defined for transitions from the low power state to the active state within a system, such as an architected recovery time in accordance with an interconnect protocol. A capability of the device can be identified, at block 915, corresponding to power management of the device. The capability can include an interrupt mechanism supported for the device and an advertised, alternate recovery time to be applied to the device in lieu of the fixed minimum recovery time. In some cases, both capabilities can be enabled for a device. Transition of the device to the active state can be completed, at block 920, for instance, through configuration of the device initiated by a trigger corresponding to the identified capability. For instance, an advertised recovery time can be applied or an interrupt can be received to trigger completion of the transition of the device to the active state prior to expiration of the fixed minimum recovery time, among other potential examples and implementations.

Figure 10:
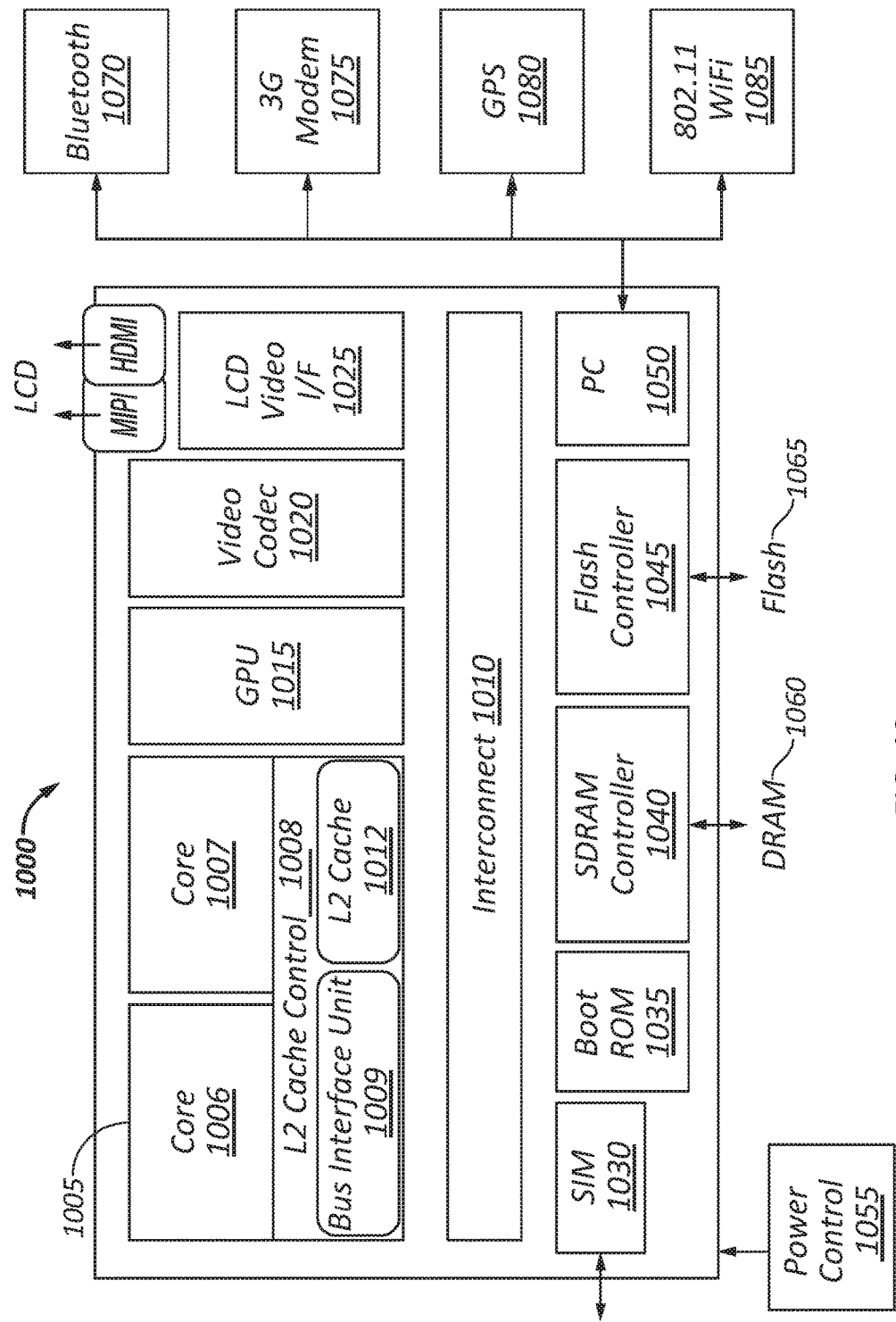
FIG. 10 illustrates another embodiment of a block diagram for a computing system.

The principles described above can apply to any variety of different architectures, including various interconnect platforms. Further, the above principles can be applied in a variety of different devices, including multi-processor servers, personal computers, mobile computing devices (e.g., smartphones, tablets, etc.), among other example. As but one example, turning to FIG. 10, an embodiment of a system on-chip (SOC) design is depicted. As a specific illustrative example, SOC 1000 can be included in a computer comprising user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1000 includes 2 cores—1006 and 1007. Similar to the discussion above, cores 1006 and 1007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1012 to communicate with other parts of system 1000. Interconnect 1010 includes an on-chip interconnect, such as an IOSF, AMBA, or other interconnect discussed above, which potentially implements one or more aspects of the described invention.

Interface 1010 provides communication channels to the other components, such as a Subscriber Identity Module (SIM) 1030 to interface with a SIM card, a boot rom 1035 to hold boot code for execution by cores 1006 and 1007 to initialize and boot SOC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the invention described herein.

In addition, the system illustrates peripherals for communication, such as a Bluetooth module 1070, 3G modem 1075, GPS 1085, and WiFi 1085. Note as stated above, a UE includes a radio for communication. As a result, these peripheral communication modules are not all required. However, in a UE some form a radio for external communication is to be included.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, and a method to determine that a device is in a low power state; initiate a transition of the device from the low power state to an active state, where a fixed minimum recovery time is defined for transitions from the low power state to the active state; identify a capability of the device corresponding to transition of the device from the low power state to the active state; and complete transition of the device from the low power state to the active state based at least in part on the capability, where the transition is to be completed prior to expiration of the fixed minimum recovery time.

In at least one example, the capability includes an interrupt capability and an interrupt is to be received from the device, where the interrupt is an indication that the device is ready to complete the transition. The device can be monitored for the interrupt.

One or more examples can further provide that the transition is to be completed according to a defined recovery time for the device if the interrupt is not received prior to the defined recovery time.

In at least one example, the defined recovery time includes the fixed minimum recovery time. The defined recovery time can includes an advertised recovery time specific to the device.

In at least one example, the capability includes an advertised recovery time for the device, and the advertised recovery time is shorter than the fixed minimum recovery time.

In at least one example, the advertised recovery time can be applied to the transition of the device from the low power state to the active state instead of the fixed minimum recovery time.

In at least one example, the fixed minimum recovery time can be applied to another device in a transition of the other device from the low power state to the active state.

In at least one example, the device includes a Peripheral Component Interconnect Express (PCIe)-compliant device. The low power state can include a D3 state and the active state include a D0 state.

In at least one example, completing the transition of the device from the low power state to the active state is to include sending of a configuration access request to the device.

In at least one example, the device includes at least one of a root port, downstream port, or a root complex integrated end point.

One or more examples can further provide, machine readable memory storing a power management capability structure defining power management capabilities of at least one device; and a power management controller to identify a particular capability for the device from the power management capability structure, and complete transition of the device from a low power state to an active state based at least in part on the particular capability, where the transition is to be completed prior to expiration of a fixed minimum recovery time defined for transitions from the low power state to the active state.

In at least one example, the power management capability structure defines for the device, whether an alternate recovery time is advertised for the device.

In at least one example, the power management capability structure defines an alternate recovery time for the device that is shorter than the fixed minimum recovery time.

In at least one example, the power management capability structure defines for the device, whether an interrupt is supported by the device, and transition of the device from the low power state to the active state is completed based on receipt of the interrupt from the device.

In at least one example, the device is to be monitored for the interrupt if the power management capability structure indicates that the device supports the interrupt.

In at least one example, initiating the transition of the device from the low power state to the active state includes providing power to the device.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A high speed serial point-to-point link interface to enable communication between a processor and a device over a physical channel, the high speed serial point-to-point link interface comprising:
   a transmitter to transmit serial data;
   a receiver to deserialize serial data; and
   control logic to implement a protocol stack, wherein the protocol stack supports a plurality of power management states, including an active state, a first off state, in which a supply voltage is maintained, and a second off state, in which the supply voltage is not to be provided to the device;
   wherein the protocol stack provides a default recovery time to allow the device to begin a transition from the first off state to the active state prior to accessing the device;
   wherein the protocol stack provides for accessing the device prior to expiration of the default recovery time to complete the transition based on a device-advertised recovery time; and
   wherein the active state is an uninitialized active state and accessing the device prior to expiration of the default recovery time to complete the transition comprises sending a configuration access request to the device.

2. The serial point-to-point link interface of claim 1, wherein the protocol stack is a peripheral component interconnect express (PCIe) protocol stack and the device is a PCIe endpoint device.

3. The serial point-to-point link interface of claim 1, wherein the device-advertised recovery time is specified in a register of the device.

* * * * *